May 6, 1930.   J. M. EHMER   1,757,518
CASING FOR TALKING MACHINES

Filed Aug. 29, 1927

Inventor:
JOHANN MICHAEL EHMER
Attorney

Patented May 6, 1930

1,757,518

UNITED STATES PATENT OFFICE

JOHANN MICHAEL EHMER, OF BEIERFELD, GERMANY, ASSIGNOR TO GEO. BORG-FELDT & CO., OF NEW YORK, N. Y., A CORPORATION OF NEW JERSEY

CASING FOR TALKING MACHINES

Application filed August 29, 1927. Serial No. 216,279.

My invention relates to a casing for talking machines, and it is an object of my invention to provide a casing which is made entirely of metal and combines cheapness with suitable construction and the elimination of rattling and resonance.

To this end, I make my casing from three independent parts, a detachable lid, a barrel, and a base plate which is permanently secured to the barrel. Each part is made separately and thereby the waste of material is reduced to a minimum, and quantity production at low cost is facilitated.

The casing made from the three parts is completely closed against the access of dust and dirt.

The motor is secured to the detachable lid so that it will come away with the lid, facilitating inspection and repair of the motor.

Washers of sound-deadening material are provided at suitable points of the casing to eliminate rattling and resonance.

The lid and the base plate are preferably provided with curved flaring edges and with ring-like flanges of smaller diameter than said curved edges which flanges are preferably tapered so as to make up a resilient connection between the lid, the base plate and the barrel.

The casing is very strong and not liable to undergo damage when being shipped, and on other occasions.

By attaching the motor supports to the lid, the necessity of separating the motor and the lid for repair etc., is eliminated and any operations of this character are made readily and at low cost.

Metal feet may be attached to the base plate and permanently secured thereto.

The casing is made entirely of metal with a view to reducing its weight, and preferably of steel plate on account of its cheapness, but it is understood that any other metal, for instance, copper, brass, aluminium etc., may be used instead.

Metal casings involve the drawback that the noise of the motor is readily transferred to them, and to remove this, the motor and the casing are insulated from each other by sound-deadening washers of rubber, felt, and the like. To provide such washers between the stays of the motor and the lid, however, is not enough as they do not eliminate the resonance of the lid with the music. This is eliminated by providing an inwardly bent flange at the centre of the lid so as to surround the motor shaft, and by inserting a sound-deadening washer between the end of the flange and the top plate of the support. In this manner the system of acoustic oscillations constituted by the lid is varied so as to absolutely prevent resonance.

Rattling might occur at the connections of the lid and the bottom plate with the barrel but this is prevented without sound-deadening means of any kind by making the flanges of the lid and the bottom plate slightly tapered so that they will react against the barrel. This resilient connection also increases the strength of the casing.

In the accompanying drawing, a casing embodying my invention is illustrated diagrammatically by way of example.

Figure 1:
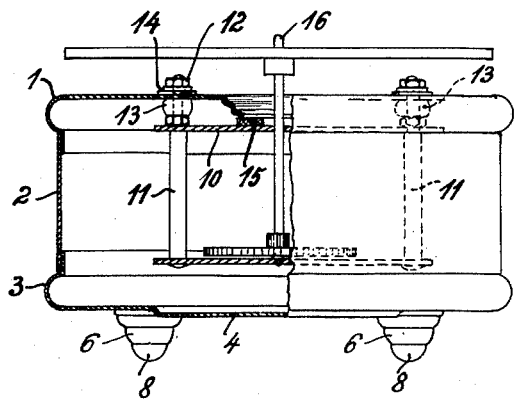
Fig. 1 is an elevation, partly in axial section, of the casing.
Figure 2:
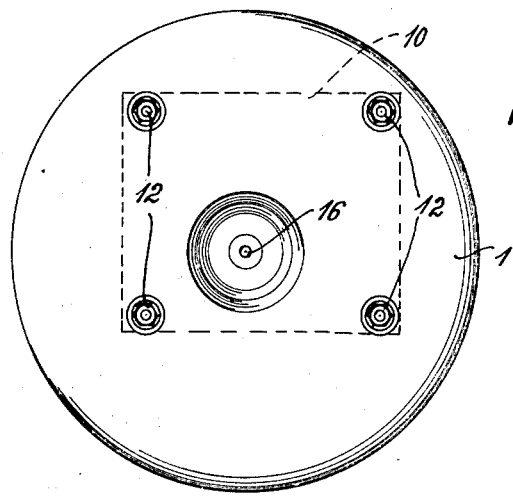
Fig. 2 is a plan view, with the record plate removed.
Figure 3:
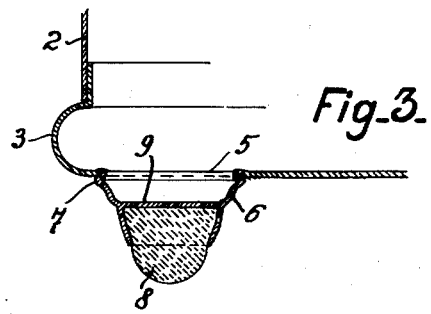
Fig. 3 is an axial section of one of the feet at the base plate, on a larger scale.

Referring now to the drawing, 1 is the lid, 2 is the barrel, and 3 is the base plate of the casing. The three parts are made of steel or other plate, as mentioned above. The casing may be cylindrical as shown, or elliptical, polygonal, etc.

The lid as well as the bottom plate are provided with machined curved edges and tapered flanges for insertion into the barrel 2.

At the centre of the lid 1, an inwardly bent flange or tube is provided for the admission of the motor shaft 16.

The bottom plate 3 is buckled at 4 for strength, and holes 5 are made in the base plate for the reception of the feet 6 which are also made from plate. 7 is an extension at the upper end of each foot which is riveted into the hole 5 and is provided with a shoulder to facilitate the insertion of the foot in proper position. 8 are rubber pads inserted in the feet, and 9 is a web against which the pads are abutted.

The barrel is made from a strip of plate bent to the shape of the lid 1 and the bottom plate 3, and preferably welded at the ends.

The casing is assembled by inserting the flanges of the lid 1 and the bottom plate 3 into the barrel 2 from either end. The two parts are held in the barrel by the reaction of their tapered flanges as described. The bottom plate 3 is permanently attached to the barrel by screws, rivets, welding, or any other suitable method, and the lid 1 may be attached by means such as a bayonet joint, screws or the like so that it is readily removed.

The motor is inserted in the casing and is preferably secured below and to the lid 1, but I am not limited to this preferred embodiment of my invention. The motor, clockwork or the like, not shown, is carried on the upper and lower supports 10, 10 which are connected by stays 11, 11 and the motor, with its shaft 16 to which the record plate is attached at the top, is arranged intermediate the two supports. The stays are reduced at their upper ends to form shoulders for the upper support. The reduced ends of the stays are threaded and project through the lid 1 in which they are held by nuts 12, 13 and 14 being washers of sound-deadening material inserted below and above the lid 1, and between the upper support 10 and the nut 12, respectively. 15 is a washer, also of sound-deadening material which is inserted between the upper support and the lower end of the central flange of the lid 1.

By setting the nuts 12, the motor is held firmly to the lid and rattling is absolutely eliminated.

It is understood that I am not in any way limited to any of the features shown and described by way of example which may be modified in many ways without departing from my invention.

I claim:

1. A metal casing for talking machines comprising a barrel, a base plate permanently secured to said barrel, a lid detachably mounted on said barrel, a motor support secured to said lid, a central flange extending inwardly from said lid, and a sound-deadening washer inserted between said flange and said support.

2. A sound proof metal casing for talking machines and the like, comprising a continuous upright barrel provided with a bottom, a cover detachably mounted upon said barrel, a ring-like flange formed on the lower side of said cover for resiliently engaging the upper end of the barrel, a motor support secured to the under side of the cover, a central flange extending inwardly from said cover, a sound-deadening washer inserted between said central flange and the support, and means on the bottom of the barrel for minimizing sound wave transmission.

3. In a talking machine, a sheet metal casing having a bottom, top, and sides, sound-deadening members for supporting the casing attached to said bottom, a motor support suspended within said casing from the top thereof, sound-deadening members inserted between said support and the top of the casing, the top of the casing having a substantially centrally located aperture therein defined by a downwardly extending flange, and a sound-deadening washer connected to said flange.

In testimony whereof I have signed my name to this specification.

JOHANN MICHAEL EHMER.